United States Patent
McCoy

(10) Patent No.: US 8,712,484 B2
(45) Date of Patent: *Apr. 29, 2014

(54) SYSTEM AND METHOD FOR CONTROLLING A WIRELESS DEVICE

(75) Inventor: James W. McCoy, Austin, TX (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/620,165

(22) Filed: Sep. 14, 2012

(65) Prior Publication Data

US 2013/0078982 A1   Mar. 28, 2013

Related U.S. Application Data

(63) Continuation of application No. 12/591,171, filed on Nov. 12, 2009, now Pat. No. 8,275,424, which is a continuation of application No. 11/412,865, filed on Apr. 28, 206, now Pat. No. 7,627,325.

(51) Int. Cl.
*H04M 1/00* (2006.01)
*H04B 1/38* (2006.01)

(52) U.S. Cl.
USPC .............. 455/574; 455/550.1; 455/552.1; 455/127.4

(58) Field of Classification Search
None
See application file for complete search history.

(56) References Cited

U.S. PATENT DOCUMENTS

2004/0180701 A1* 9/2004 Livet et al. ............... 455/574

* cited by examiner

*Primary Examiner* — Vladimir Magloire
(74) *Attorney, Agent, or Firm* — Fay Kaplun & Marcin, LLP

(57) ABSTRACT

A method is provided for controlling operation of a wireless device, including: receiving an initial incoming signal from a remote device in a first operational mode, the initial incoming signal including information related to an initial remaining battery power in the remote device; determining that a second operational mode will be a first possible mode if the initial remaining battery power in the remote device is within a first power range; determining that the second operational mode will be a second possible mode if the initial remaining battery power in the remote device is within a second power range; and transmitting instructions to the remote device in the first operational mode to transmit and receive in the second operational mode.

18 Claims, 4 Drawing Sheets

SYSTEM AND METHOD FOR CONTROLLING A WIRELESS DEVICE

PRIORITY AND RELATED APPLICATIONS

This application is a continuation of and claims priority to co-owned U.S. patent application Ser. No. 12/591,171, entitled "SYSTEM AND METHOD FOR CONTROLLING A WIRELESS DEVICE", filed Nov. 12, 2009 (issuing as U.S. Pat. No. 8,275,424), which is a continuation of co-owned U.S. Pat. No. 7,627,325, entitled "SYSTEM AND METHOD FOR CONTROLLING A WIRELESS DEVICE", each of the foregoing being incorporated herein by reference in its entirety.

CROSS REFERENCE TO RELATED APPLICATIONS

This application is a continuation of U.S. patent application Ser. No. 11/412,865, entitled "SYSTEM AND METHOD FOR CONTROLLING A WIRELESS DEVICE," filed on 28 Apr. 2006, the contents of which are hereby incorporated by reference in their entirety.

FIELD OF THE INVENTION

The present invention relates in general to a system and method for controlling the operation of a wireless device. In particular it relates to a system and method for dynamically changing the mode of a remote wireless device to account for changing device, network, or environmental parameters.

BACKGROUND OF THE INVENTION

In any transmission of data between wireless devices, the parameters of the transmission must be set in a way known to both the transmitter and the receiver. A particular arrangement of such parameters can be called a mode of transmission or operational mode, which allows devices to be set up to operate in a particular mode of operations. In various operational modes, the parameters can include the particular formatting of data to be sent, the speed of transmission, the type of signal flow used, etc.

Signal formatting refers to the many varieties of signal standards that can be used. In a cell phone network, this could include the third generation (3G) long term evolution (LTE) standard, the global system for mobile phones (GSM) standard, or any other suitable cell phone protocol. In other wireless environments, other signal standards could be used to set the signal formatting.

The speed of transmission may be varied in some embodiments. In this case transmissions at different speeds would be classified as separate modes. This is because even if the same data formatting style were used, the difference in transmission speed would require different handling.

The type of signal flow would indicate whether the data transmissions are simplex, half-duplex, full duplex (sometimes simply referred to as 'duplex'), or some variation of these. In simplex transmissions, data transmission is unidirectional. In other words, when two devices are in communication only one of the two devices sends data and only one of the two devices receives data. The transmitting device must have some kind of transmitter circuit, and the receiver device must have some kind of receiver circuit. In full duplex transmissions, data transmission is bidirectional. In other words, when two devices are in communication they each send and receive data at the same time. The two communicating devices must each have some kind of transceiver circuit configured to simultaneously transmit and receive signals. In half-duplex transmissions, data is sent in both directions, but not at the same time. In other words, the system allows for serial simplex transmission, with the two devices switching off as to who will be the transmitter and who will be the receiver. Like full duplex, half-duplex requires each device to include a transceiver circuit. However, since the devices do not transmit and receive at the same time, these transceiver circuits need not be configured for simultaneous transmission and reception.

As different device operational modes have become more prevalent in the marketplace, manufacturers inevitably desire to create devices that function in more than one mode. At present, mode changes are made either manually by a device operator, or are initiated by the device itself, requiring a hard shutdown of the previous communication and the mode is not changed until such a process happens again. This mode change is usually in response to coverage issues, such as a lack of coverage in given multiple access scheme or the presence of coverage in a new multiple access scheme that offers better services. This limited responsiveness can be disadvantageous, however, in certain circumstances where environmental, network, or device parameters change, it could be disadvantageous to maintain the same operational mode.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
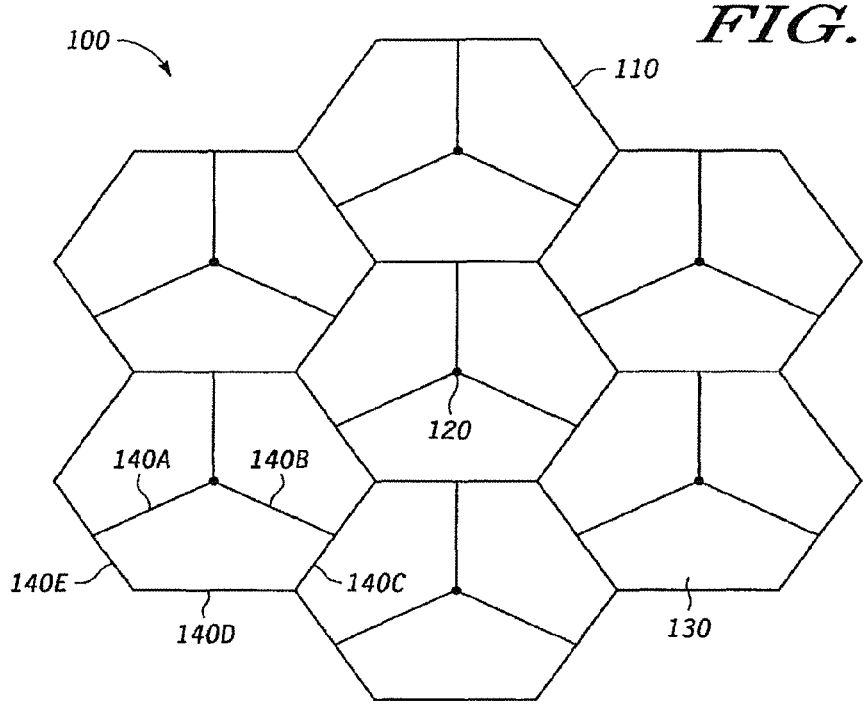
FIG. 1 is a diagram of the coverage of a wireless network according to a disclosed embodiment.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs), and in particular through the use of circuits involving CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

LTE Network

One exemplary embodiment of the present claimed invention is with respect to a long term evolution (LTE) cell phone network. In such a network it can be advantageous to dynamically shift the mode of a mobile device (i.e., a cell phone) from a full duplex mode to a half-duplex mode and back again. One reason this would be desirable is to allow the base station to control the reliability of transmissions between the base station and the mobile device based on various network criteria, e.g., quality of service (QoS) criteria. Another reason is to allow mobile units to request to enter different modes based on their local need.

For purposes of disclosure an exemplary embodiment will be shown that relates to changing between a full duplex mode and a half-duplex mode in an LTE cell phone. However, the present claimed invention should not be limited to such an embodiment. It is generally applicable to the dynamic selection of operational modes relating to any criteria, e.g., the data formatting scheme used by a network, the speed of transmission, the type of signal flow used, or any other parameter that may be changed between operational modes. Alternate embodiments could also involve choosing between more than two modes if a plurality of modes are offered as viable alternatives. In such an embodiment, a device could dynamically switch between all possible modes.

FIG. 1 is a diagram of the coverage of a wireless network according to a disclosed embodiment. This embodiment shows a cell phone network by way of example. As shown in FIG. 1, the coverage area for the wireless network 100 is divided into a plurality of adjacent hexagonal areas 110. Each hexagonal area 110 has a base station 120 at its center, and is evenly divided into three adjacent pentagonal areas 130 surrounding the base station 120. Each pentagonal area 130 is defined by a first edge 140A, a second edge 140B, a third edge 140C, a fourth edge 140D, and a fifth edge 140E.

The hexagonal areas 110 each represent a roughly circular effective range of a base station 120. They are formed to be hexagonal in shape so that they may more tightly overlap. The size of the hexagonal areas 110 is chosen such that the mobile devices used within the wireless network 100 have sufficient power to reach a corresponding base station 120 at the center of the hexagonal area 110. In other words, the size is chosen such that the effective broadcast length of a relevant mobile device is no less than the length from a base station 120 to an outside corner of a corresponding hexagonal area 110.

The base stations 120 are formed in the center of their respective hexagonal area 110, and broadcast with sufficient power to reach any mobile device operating within the hexagonal area 110. Each base station 120 generally coordinates the operation of many mobile devices within the hexagonal area 110 surrounding it. As a result, a base station 120 should include a transceiver that is configured to send and receive multiple signals at the same time.

The adjacent pentagonal areas 130 represent smaller areas of coverage than the entire hexagonal area 110. Some wireless networks (e.g., the exemplary cell phone network) subdivide the hexagonal areas 110 in this way. In such networks, the same base station 120 services each of the three pentagonal areas 130 surrounding it.

Despite being controlled by the same base station 120, each of the adjacent pentagonal areas 130 is treated differently for purposes of signal separation. For example, each pentagonal area 130 may be separated from the areas adjacent to it through the use of different codes, different frequencies, or some other separation mechanism. This means that while a cell phone in one pentagonal area 130 might hear the signals from an adjacent pentagonal area 130, the codes will not match up, so it will know not to listen to them.

However, although each mobile device will be able to ignore the content of signals in adjacent pentagonal areas 130 because of the use of different codes, the signals themselves will remain, providing signal interference. In other words, while the network instructions sent from a base station 120 for an adjacent pentagonal area 130 cannot be read by a mobile unit assigned to a different pentagonal area 130, if the mobile device is close enough to the adjacent pentagonal area 130, the signal meant for the adjacent pentagonal area 130 might interfere with the signal for the current pentagonal area 130. This is particularly true if the two pentagonal areas 130 use the same or similar frequency spectrum for data transmission. As a result, the signal for an adjacent pentagonal area 130 may act as noise for the current pentagonal area 130.

The first through fifth edges 140A-140E, therefore, define areas of greatest potential signal interference from signal originating in an adjacent pentagonal area 130. The closer a mobile unit is to one of the edges 140A-140E, the more likely that mobile device is to hear an adjacent signal as noise. For this reason mobile device users who are near the edges 140A-140E are called cell edge users, and are considered at a higher risk for noise interference than non-edge users. All users suffer the same chance for random noise interference. But cell edge users run the very significant further risk that there will be additional interfering signals of high strength on exactly the wireless frequency used by the device.

This is where dynamic switching between operational modes can improve performance. Different operational modes provide different advantages and disadvantages. Some modes are fast and simple, but not terribly robust in the face of strong interference, Others are slower or more complicated, but can handle greater interference with a smaller chance of dropping a connection.

Thus, one way to address the issue of edge interference (or any interference, really) is to have cell phone users default to operating in a standard mode optimized for non-edge operation, and switch the users to a more robust operational mode when they get close to an edge 140A-140E and become cell edge users. Then the system can switch them back to the standard mode when they leave the edge area.

For example, in an LTE cell phone system, the default operational mode might be a full duplex LTE mode, while the edge mode might be a half-duplex LTE mode. This would require each mobile device to switch from a full duplex mode to a half-duplex mode when it neared an edge (or other interfering element), and then switch back from the half-duplex mode to the full duplex mode when the device left the vicinity of the edge (or other interfering element). This could involve a user approaching an edge and then turning away to return to the same initial pentagonal area 130, or could involve the user crossing an edge boundary into a new pentagonal area 130. In either case, the proximity of the edge (or other interfering element) represents a potential for interference, and may involve a need for mode change.

Although FIG. 1 shows the hexagonal areas 110 and the pentagonal areas 130 to be identical in size and uniform in placement, and the base stations 120 each in the exact center of their respective hexagonal area, it should be understood that in an actual implementation the placement of the base stations and the shapes of the various hexagonal areas 110 and pentagonal areas 130 could be extremely irregular because they are determined by the radio propagation environment in the area, e.g., the number of buildings between each base site and the mobile device.

In addition, although the above description refers primarily to interference resulting from users entering into proximity of a cell edge, the described devices and processes are applicable to any source of interference, or any other reason for which it may be desirable to dynamically alter the mode of a mobile device.

Mobile Device

Figure 2:
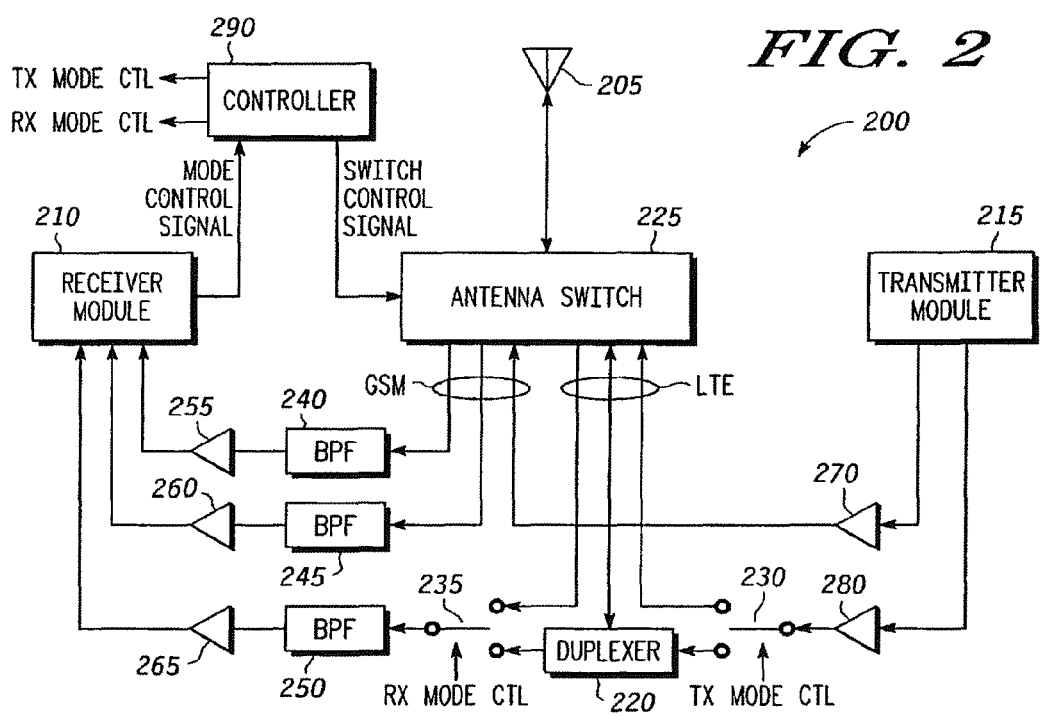
FIG. 2 is a block diagram of an mobile device according to a disclosed embodiment.

FIG. 2 is a block diagram of a mobile device according to a disclosed embodiment. This mobile device is configured to operate in either a GSM or an LTE network. As shown in FIG. 2, the mobile device 200 includes an antenna 205, a receiver module 210, a transmitter module 215, a duplexer 220, an antenna switch 225, a transmitter switch 230, a receiver switch 235, first, second, and third band pass filters 240, 245, and 250, first, second, and third receiver amplifiers 255, 260, 265, first and second transmitter amplifiers 270 and 280, and a switch controller 290. More generally, the mobile device 200 could be referred to as a remote device.

The antenna 205 can be any appropriate antenna for transmitting and receiving wireless signals. In one disclosed embodiment it is a cell phone antenna. However, in different types of mobile devices it should be implemented appropriately.

The receiver module 210 is a set of circuitry configured to receive and process an incoming signal from the antenna 205, while the transmitter module 215 is a set of circuitry configured to generate an appropriate outgoing signal to the antenna 205.

The duplexer 220 is a circuit configured to allow the antenna 205 to successfully transmit and receive signals simultaneously.

The antenna switch 225 is a switch for connecting a variety of circuit elements to the antenna 205 in response to a switch control signal. In operation, the antenna switch 225 only provides a single connection at a time, based on a current operational mode.

The transmitter switch 230 is a switch for connecting signals from the transmitter module 215 to either the duplexer 220 or the antenna switch 225, while the receiver switch 235 is a switch for connecting signals from either the duplexer 220 or the antenna switch 225 to the receiver module 210.

The first low pass filter 240 and the first receiver amplifier 255 are connected in series between the antenna switch 225 and the receiver module 210, and are configured to provide appropriate front end processing for a first GSM receiver path. Similarly, the second low pass filter 245 and the second receiver amplifier 260 are connected in series between the antenna switch 225 and the receiver module 210, and are configured to provide appropriate front end processing for a second GSM receiver path.

The third low pass filter 250 and the third receiver amplifier 265 are connected in series between the receiver switch 235 and the receiver module 210, and are configured to provide appropriate front end processing for an LTE receiver path.

The first transmitter amplifier 270 is connected between the transmitter module and the antenna switch 225 and is configured to provide amplification for a GSM transmission path. The second transmitter amplifier 280 is connected between the transmitter module and the antenna switch 225 and is configured to provide amplification for an LTE transmission path.

Particular parameters for the band pass filters 240, 245, and 250, the receiver amplifiers 255, 260, and 265, and the transmitter amplifiers 270 and 280 can be chosen as would be understood by one skilled in the art. In alternate embodiments any or all of these filters and amplifiers could be eliminated, or additional front end/back end circuitry could be included in the various receiver and transmitter paths.

The switch controller 290 provides a switch control signal to the antenna switch 225, a transmit mode control signal to the transmitter switch 230, and a receiver mode control signal to the receiver switch 235, all in response to a mode control signal received from the receiver module.

The mobile device of FIG. 2 facilitates four possible connections: a GSM mode receive connection, a GSM mode transmit connection, an LTE full duplex mode connection, an LTE half-duplex mode transmit connection, and an LTE half-duplex mode receive connection. In the GSM mode, the antenna switch 225 connects the antenna 205 to one of the first and second band pass filters 240 and 245 when signals are to be received, and connects the antenna 205 to the first transmit amplifier 270 when signals are to be transmitted. In the LTE full duplex mode, the antenna switch 225 connects the antenna 205 to the duplexer 220, the transmitter switch 230 connects the second transmitter amplifier 280 to the duplexer 220, and the receiver switch 235 connects the third band pass filter 250 to the duplexer. And in the LTE half-duplex mode, the antenna switch 225 and the transmitter switch 230 connect the antenna 205 to the second transmitter amplifier 280 when data is to be transmitted, while the antenna switch 225 and the receiver switch 235 connect the antenna 205 to the third band pass filter 250 when data is to be received.

As shown in FIG. 2, a multiple-mode transceiver is provided. The transceiver includes: an antenna switch configured to selectively connect a first antenna switch node to one of a second antenna switch node, a third antenna switch node, or a fourth antenna switch node; a receiver switch configured to selectively connect a first receiver switch node to one of a second receiver switch node or a third receiver switch node, the second receiver switch node being connected to the third antenna switch node; a transmitter switch configured to selectively connect a first transmitter switch node to one of a second transmitter switch node or a third transmitter switch node, the second transmitter switch node being connected to the fourth antenna switch node; a receiver module configured to receive and process incoming signals and to generate a mode control signal based on the incoming signals, the receiver module being connected to the first receiver switch node; a transmitter module configured to generate outgoing signals, the transmitter module being connected to first transmitter switch node; a duplexer configured to simultaneously pass the incoming signals and the outgoing signals, the duplexer having an antenna transmit/receive node connected to the second antenna switch node, a device receiver node connected to the third receiver switch node, and a device transmitter node connected to the third transmitter switch node; and a controller configured to generate, in response to the mode control signal, an antenna switch control signal to control operation of the antenna switch, a receiver switch control signal to control operation of the receiver switch, and a transmitter switch control signal to control operation of the transmitter switch.

The transceiver may further include a receiver amplifier and a band pass filter connected in series with the receiver amplifier. The receiver module may be connected to the first receiver switch node through the band pass filter and the receiver amplifier. Similarly, the transceiver may further include a transmitter amplifier. The transmitter module may be connected to the first transmitter switch node through a transmitter amplifier. The device may be implemented in an integrated circuit device.

By way of example, this shows four possible modes. However, all that is necessary is the presence of two possible modes. In fact, in some embodiments it is possible to have multiple modes, only a subset of which can be switched dynamically. For ease of explanation, the following description will only refer to switching between two modes. This is for descriptive purposes only, and should not be considered limiting.

Base Station

Figure 3:
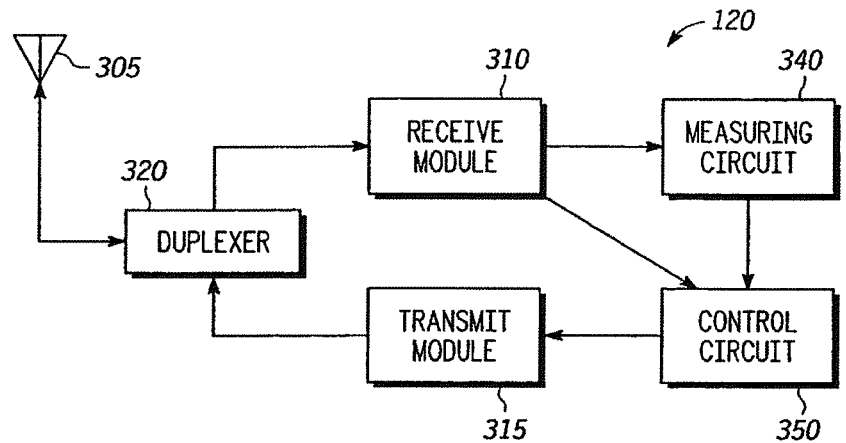
FIG. 3 is a block diagram of a base station according to a disclosed embodiment.

FIG. 3 is a block diagram of a base station according to a disclosed embodiment. This can be the sort of base station shown in FIG. 1. As shown in FIG. 3, the base station 120 includes an antenna 305, a duplexer 320, a receive module 310, a transmit module 315, a measuring circuit 340, and a control circuit 350. More generally, the base station 120 could be referred to as a controller device.

The antenna 305 can be any appropriate antenna for transmitting and receiving wireless signals. In one disclosed embodiment it is a cell phone base station antenna. However, in different types of base station 120 should be implemented appropriately.

The duplexer 320 is a circuit configured to allow the antenna 205 to successfully transmit and receive signals simultaneously to and from the transmit module 320 and the receive Module 310.

The receive module 310 is a set of circuitry configured to receive and process an incoming signal, while the transmit module 315 is a set of circuitry configured to generate an appropriate outgoing signal.

The measuring circuit 340 is a circuit designed to measure a particular signal metric of an incoming signal. This can be a measure of signal-to-noise ratio (SNR), signal-to-interference ratio (SIR), signal-to-interference-plus-noise ratio (SINR), signal power, a quality of service (QoS) requirement, or some other measure of signal quality. In alternate embodiments the determination of properties other than signal quality could be made, if such properties were relevant to a change in modes. For example, in some embodiments the base station 120 could consider data relating to the remaining battery power of a given mobile device 200 to determine whether the mobile device 200 should be transitioned to a lower power operational mode. In other embodiments, the base station 120 could consider the level of traffic on the network, e.g., switching all users in the network to a half-duplex mode during off-peak hours.

The control circuit 350 is a circuit configured to generate a set of mode control instructions in response to either or both of signals received directly from the receive module 310 or signal metric information received from the measuring circuit 340. These mode control instructions are forwarded to the transmit module for transmission to a mobile device 200.

Mode Selection Process

Figure 4:
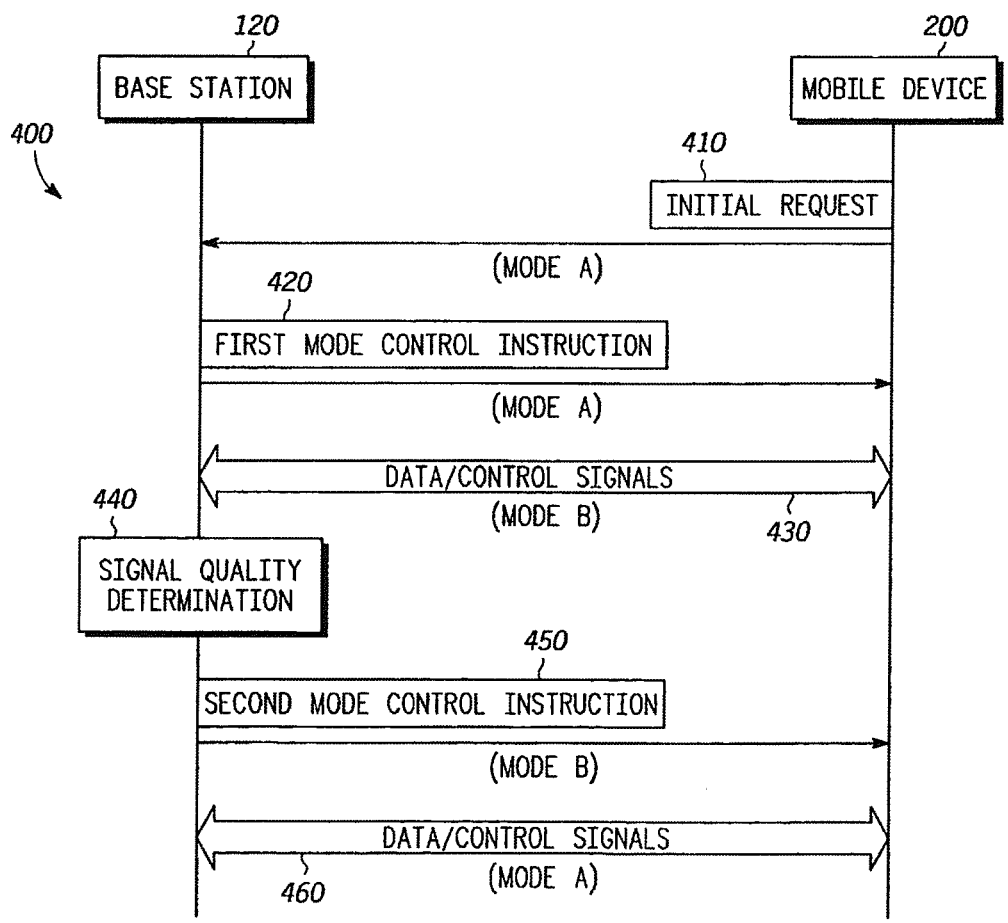
FIG. 4 is a message sequence chart showing the interaction between the mobile device of FIG. 2 and the base station of FIG. 3 according to a disclosed embodiment.

FIG. 4 is a message sequence chart showing the interaction between the mobile device of FIG. 2 and the base station of FIG. 3 according to a disclosed embodiment. In particular, FIG. 4 shows how messages pass between a mobile device 200 and a base station 120 so that the base station 120 can set the mode of the mobile device 200.

For the purposes of this example, the described network will be an LTE network with mobile devices capable of operating in a full duplex mode or a half-duplex mode. Alternate embodiments could use different types of networks with different types and numbers of modes.

As shown in FIG. 4, the passing of messages begins when the mobile device 200 sends an initial request 410 to the base station. This request will be sent in a default mode (i.e., Mode A) known to both the mobile device 200 and the base station 120.

In one embodiment the initial request 410 could be a first attempt by the mobile device 200 to connect to the base station 120. In this case, Mode A would be a default operational mode determined beforehand in the network for such initial association requests. In alternate embodiments, however, the initial request 410 could represent a communication between the mobile device 200 and the base station 120 in an established communication stream. In this case, Mode A is whatever mode the base station 120 had previously instructed the mobile device 200 to use. In some embodiments the mode of initial acquisition will be a half-duplex mode because that will provide better random access channel coverage.

The base station 120 may respond to the initial request 410 with a first mode control instruction 420 instructing the mobile device 200 to switch to a new operational mode without any signal quality determination. This could be done according to a set mode control scheme. For example, if the initial request were the first message for a new mobile device 200 talking to the base station 120, the initial request could be sent in a half-duplex mode, and the base station 120 might, as a matter of course, instruct all new mobile devices 200 to switch to full duplex once they were properly connected to the network.

In some embodiments the first mode control instruction 420 might only be sent if there is a change in operational modes (e.g., from Mode A to Mode B). In other embodiments the first mode control instruction 420 might be sent always to indicate the current operational mode, regardless of whether it involved a change of operational mode or not.

In the embodiment disclosed in FIG. 4, the first mode control instruction 420 instructs the mobile device 200 to change operational modes to Mode B. However, since the mobile device 200 is still operating in Mode A, the first mode control instruction 420 is still sent in Mode B.

Once the first mode control signal 420 has been received by the mobile device 200, the mobile device 200 and base station 120 engage in data transmission, passing various data and control signals 430 using the newly instructed mode (i.e., mode B in this embodiment).

The duration of the data transmission 430 can be fixed or vary, depending upon the embodiment. Regardless, at some point, the base station 120 will make a signal quality determination 440 of a signal received from the mobile device 200. This can be a measure of signal-to-noise ratio (SNR), signal-to-interference ratio (SIR), signal-to-interference-plus-noise ratio (SINR), signal power, a quality of service (QoS) requirement, or some other measure of signal quality. In alternate embodiments a determination of properties other than signal quality could be made, if such properties were relevant to a change in modes. For example, in some embodiments the base station 120 could consider data relating to the remaining battery power of a given mobile device 200 to determine whether the mobile device 200 should be transitioned to a lower power operational mode. In other embodiments it might consider the current level of network congestion to determine whether the mobile device 200 should be transitioned to a different operational mode.

Once the signal quality determination 440 (or other parameter determination) is completed, the base station 120 will determine what the proper new mode should be (i.e., whether to retain the current operational mode or whether to switch to a different operational mode), and sends a second mode control instruction 450 indicating what the new operational mode ought to be. Again, since the mobile device 200 is still operating in the current operational mode (i.e., Mode A at this point in operation), the second mode control instruction 450 must be in the current operational mode, regardless of what mode it instructs the mobile device 200 to use.

As with the first mode control instruction 420, in some embodiments the second mode control instruction 450 might only be sent if there is a change in operational modes (e.g., from Mode B to Mode A). In other embodiments the second mode control instruction 450 might be sent always to indicate the current operational mode, regardless of whether it involved a change of operational mode or not.

As noted above, in one embodiment Mode A is a half-duplex mode and Mode B is a full duplex mode. The half-duplex mode of operation (Mode A) is used by the mobile device 200 to secure initial contact with the base station 120, after which the mobile device moves to a full duplex mode of operation (Mode B) for later transmissions.

Once the second mode control signal 450 has been received by the mobile device 200, the mobile device 200 and base station 120 engage in data transmission, passing various data and control signals 430 using the newly instructed mode (i.e., mode A in this embodiment).

This process of signal quality determination and passing of mode control instructions can be repeated as many times as desired during device operation.

In some alternate embodiments either the initial request or some portion of the data/control signals 430 might include a specific request from the mobile device to change operational modes. In this case, the first or second mode control instructions 420 and 450 may be in whole or in part a response to this explicit request from the mobile device 200. However, it is also possible for the mobile device 200 to request a particular operational mode only to have the base station 120 decide not to permit that mode for reasons known to the base station 120. In this case the base station 120 would either not provide any mode control instructions, or instruct that a different operational mode be used.

Operation of the Mobile Device

Figure 5:
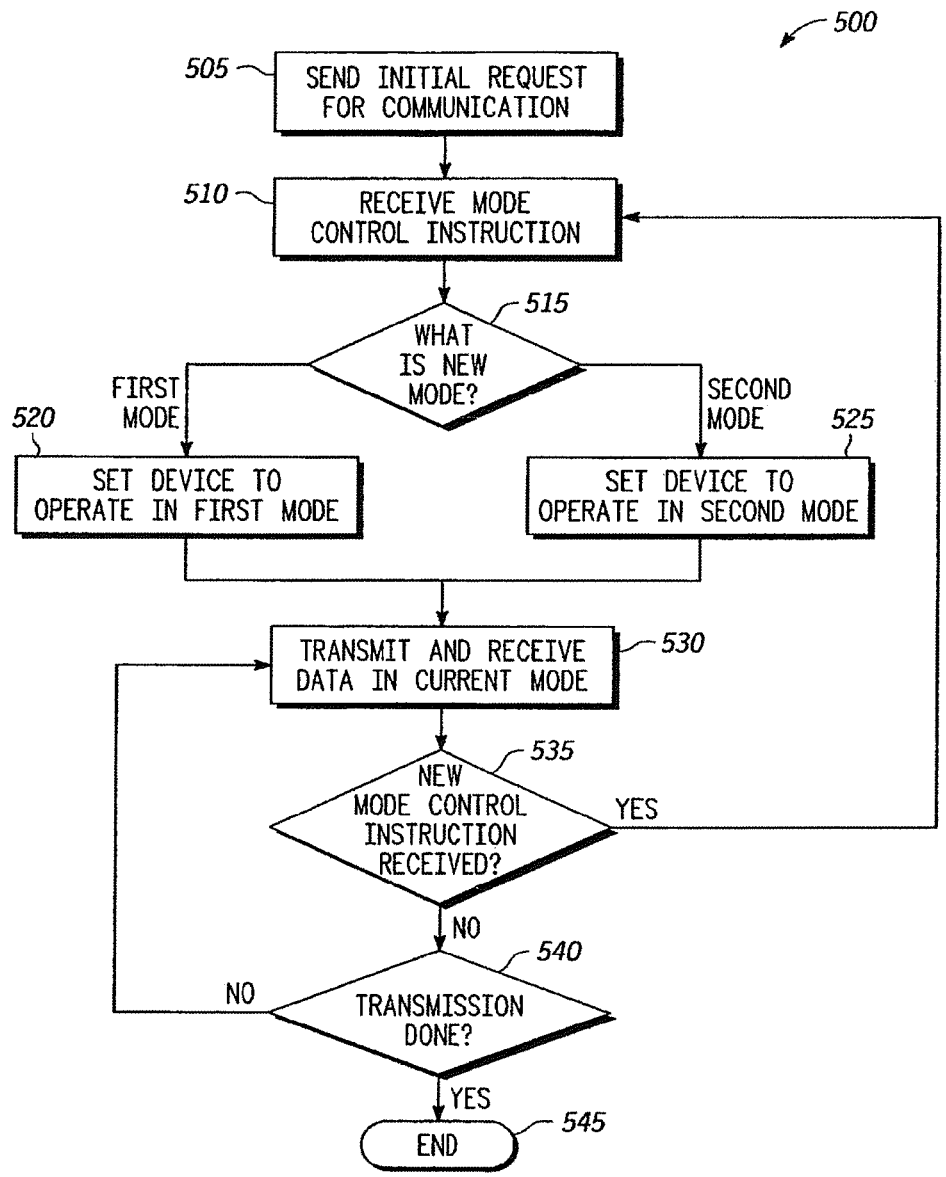
FIG. 5 is a flow chart of the operation of the mobile device of FIGS. 2 and 4 according to a disclosed embodiment.

FIG. 5 is a flow chart of the operation of the mobile device of FIG. 2 according to a disclosed embodiment.

As shown in FIG. 5, the mode controlling process 500 begins when the mobile device 200 sends an initial request for communication to the base station 120. (505) This initial request could come, for example, when the mobile device 200 is first turned on in an area controlled by a given base station 120 (e.g, a pentagonal cell area 130). It will generally be sent in an initial mode that is preset and known by the base station 120 and all potential mobile devices 200.

Some time after it has sent the initial request for communication (505), the mobile device 200 will receive a mode control instruction from the base station 120. (510) This corresponds to the first mode control instruction 420 from FIG. 4, and provides the mobile device 200 with instructions regarding in what mode it should proceed to operate.

The mobile device 200 will then read the mode control instruction and determine what the newly assigned operational mode is. (515) If it is a first mode, the mobile device 200 will set the device to operate in the first mode. (520) If it is a second mode, the mobile device 200 will set the device to operate in the second mode, (520) In the embodiment disclosed in FIG. 2, setting the device to operate in an appropriate mode (520 or 525) involves having the switch controller 290 provide an appropriate switch control signal, transmitter mode control signal, and receiver mode control signal to control the operation of the antenna switch 225, the transmitter switch 230, and the receiver switch 235 to provide appropriate connections for the assigned operational mode. If the assigned mode is for some reason the current mode, then no additional action is necessary.

In an embodiment with additional operational modes, a more complex determination of assigned mode (515) will be performed, and additional processes for configuring the device according to the assigned operational mode will be provided.

Once the operational mode is set (520, 525), the mobile device 200 proceeds to transmit and receive data in its currently-assigned operational mode. (530) This data can include a request sent from the mobile device 200 to the base station 120 requesting that the mobile device 200 be assigned a different mode.

As the mobile device 200 is transmitting and receiving in its currently-assigned operational mode (530), it will continually determine whether a new mode control instruction has been received (535) and whether the device is done with transmissions. (540) These two operations can be performed in any order, and may even be performed in parallel.

If new mode control instructions have been received (535), the mobile device 200 will again receive and process these instructions (510), determine the new mode (515), and continue operation from that point.

If the transmission is not done (540) the mobile device continues to transmit and receive data in the current mode. (530) If the transmission is done (540), processing ends for the mobile device 200.

In one embodiment, the initial request for communication (505) is sent in a half-duplex mode, and the mode control instruction (510) instructs the mobile device 200 to switch to a full duplex mode.

In some embodiments, either the initial request for communication (505) or the data transmitted in the current mode (530) may include a request from the mobile device 200 that it operate in a particular mode. For example, the mobile device 200 may wish to conserve battery power and enter into an operational mode that consumes less power, regardless of whether current signal quality might allow a higher power mode. In such embodiments the base station 120 will consider these requests when determining the new mode and may or may not allow the mode switch.

As shown in FIG. 5, a method is provided for controlling operation of a wireless device. This method includes transmitting an initial signal to a controller device in a first operational mode; receiving initial instructions from the controller device in the first operational mode, after transmitting the initial signal, the initial instructions identifying a second operational mode; setting transmit and receive circuitry in the wireless device to transmit and receive according to the second operational mode; and transmitting operational signals in the second operational mode.

The initial signal may include a request for assignment of a specific mode. The second operational mode may be one of a full duplex mode or a half-duplex mode.

The method may further include determining whether the second operational mode is different from the first operational mode. In this case, the operation of setting transmit and receive circuitry in the wireless device to transmit and receive according to the second operational mode may only be performed if the second operational mode is determined to be different than the first operational mode.

The method may further include receiving new instructions from the controller device in the second operational mode, after transmitting the operational signals, the new instructions identifying a third operational mode; setting the transmit and receive circuitry in the wireless device to transmit and receive according to the third operational mode; and transmitting new signals in the third operational mode.

The receiving new instructions, setting the transmit and receive circuitry, and transmitting new signals may be periodically repeated, the third operational mode from a previous iteration being considered the second operational mode for new iteration. The method may be implemented in an integrated circuit device.

Operation of the Base Station

Figure 6:
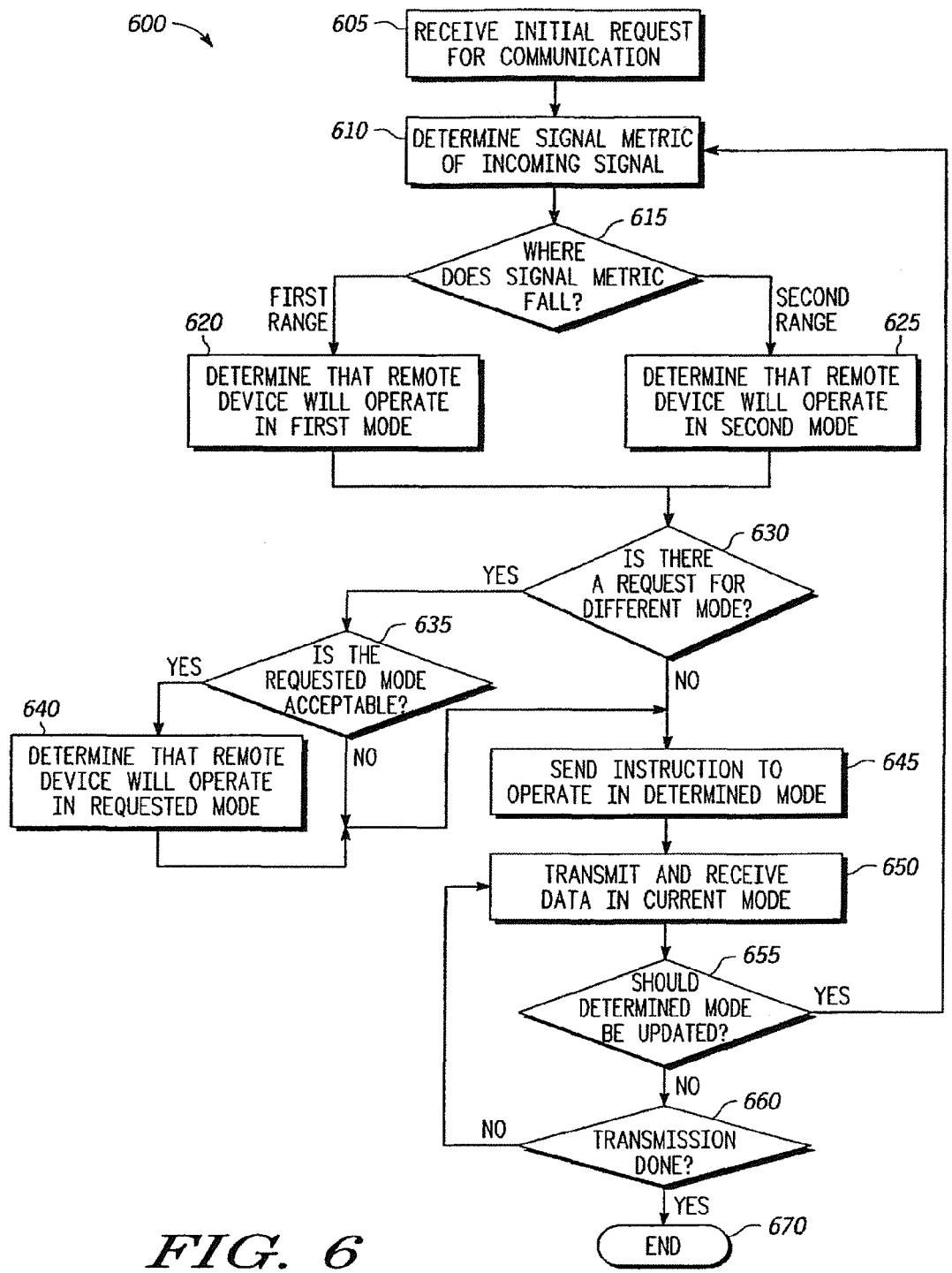
FIG. 6 is a flow chart of the operation of the base station of FIGS. 3 and 4 according to a disclosed embodiment.

FIG. 6 is a flow chart of the operation of the base station of FIGS. 3 and 4 according to a disclosed embodiment.

As shown in FIG. 6, the base station 120 first receives an initial communication from a mobile device 200 as an incoming signal. (605) This initial communication can be an initial request to join a network or some other sort of communication signal.

The base station 120 then determines a signal metric of the incoming signal. (610) In the circuit of FIG. 3, this can be performed in the measuring circuit 340. Exemplary signal metrics include SNR, SIR, SINR, signal power, a QoS requirement, or any desired signal metric. In alternate embodiments the determination of different operational metrics other than a signal metric could be made, if such operational metrics were relevant to a change in modes. For example, in some embodiments the base station 120 could consider device metrics relating to the remaining battery power of a given mobile device 200 to determine whether the mobile device 200 should be transitioned to a lower power operational mode. In other embodiments the base station 120 could consider network metrics such as the congestion level in the network. For example, in off-peak hours, the network may request that the mobile device 200 operate in half-duplex mode, while during peak hours, the mobile device 200 might operate in full-duplex mode.

After determining the signal metric (610), the base station 120 then determines where the signal metric falls. (615) If it falls within a first range of values then the base station 120 determines that the mobile device 200 should operate in a first operational mode (620); and if it falls within a second range of values then the base station 120 determines that the mobile device 200 should operate in a second operational mode (625). If different metrics were used for the mode determination, this operation would analyze those properties.

The base station 120 then determines whether the incoming signal includes a request for a different mode of operation. (630) If the incoming signal does include such a request, the base station 120 then determines whether this request is acceptable. (635) This determination of acceptability could be made based on the signal metric determination (i.e., is the signal too weak for the requested mode), network parameters (i.e., is the network too busy for the requested mode), or any other desirable criteria.

If there is both a request for a specific mode (630) and the mode is determined to be acceptable (635), the base station changes its determination of mode to the mode requested by the mobile device 200. (640) In some cases this may not involve a change, since the mobile device 200 might have requested the same mode that the base station 120 determined based on the signal metric analysis.

Regardless of how the new operational mode is determined, the base station 120 then sends a set of instructions to the mobile device 200 to operate in the determined mode. (645)

The base station 120 and the mobile device 200 can then engage in transmitting and receiving data in the determined mode for a time. (650) periodically the base station 120 can check whether the mode needs to be updated. (655) This determination could be based on time (i.e., an update is done according to a certain period), based on a request from the mobile device 200, or any other desired criteria.

If the mode should be updated (655), the base station once more determines a signal metric of the most recent incoming signal (610) and repeats the steps following that determination.

If the mode need not be updated (655), the base station 120 determines whether the transmission is completed. (660) If so, the process ends. (665) If not, the base station 120 continues to transmit and receive with the mobile device 200 (635) until it is once again time to determine whether the mode should be updated. (640)

Although the determination of whether a transmission is completed (660) is shown as being performed after the determination of whether a mode should be updated (655), these need not be performed in that order. In fact, in some embodiments they can be performed in parallel.

Likewise, although shown as taking place right after the signal metric determination (615-625), the steps of processing a remote request can be performed at varying times throughout signal processing, as desired. In alternate embodiments in which no mode requests are ever made from a mobile device 200, the steps of processing the remote request may be removed.

Although the systems and methods shown above have the various modes of operation changing based on certain fixed thresholds or ranges of the signal metric, in some embodiments the mode switching can have some kind of hysteresis. In other words, the thresholds to change modes can be slightly different depending upon which direction the mode change is being made (i.e. from Mode A to Mode B or Mode B to Mode A), to prevent multiple rapid mode changes when the signal metric is near a threshold or boundary.

As shown in FIG. 6, a method for controlling operation of a wireless device is provided. The method includes receiving an initial incoming signal from a remote device in a first operational mode; determining a first operational metric; determining that a second operational mode will be a first possible mode if the first operational metric is within a first range; determining that the second operational mode will be a second possible mode if the first operational metric is within a second range; and transmitting instructions to the remote device in the first operational mode to transmit and receive in the second operational mode.

The first operational metric may be a signal metric of the initial incoming signal, more specifically one of a signal-to-noise ratio of the initial signal, signal-to-interference ratio of the initial signal, signal-to-interference-plus-noise ratio of the initial signal, and signal power of the initial signal. The first operational metric may also be a network metric indicating a network congestion level.

The method may further include receiving an operational incoming signal from a remote device in the second operational mode after transmitting the instructions to the remote device; determining a second operational signal metric of the initial incoming signal; determining that a third operational mode will be the first possible mode if the second operational signal metric is within the first range; determining that the third operational mode will be the second possible mode if the second operational signal metric is within the second range; transmitting instructions to the remote device in the second operational mode to transmit and receive in the third operational mode.

The receiving of the operational incoming signal, the determining of the second operational signal metric, the determining that the third operational mode will be the first possible mode if the second operational signal metric is within the first range, the determining that the third operational mode will be the second mode if the second operational signal metric is within the second range, and the transmitting the instructions to the remote device are periodically repeated, the third operational mode from a previous iteration being considered the second operational mode for new iteration.

The method may further include receiving an operational incoming signal from a remote device in the second operational mode after transmitting the instructions to the remote device, the operational incoming signal including a request for assignment of a requested mode; determining whether the requested mode is an appropriate mode; setting a third operational mode to be the requested mode if the requested mode is appropriate; setting the third operational mode to be an alternate mode if the requested mode is not appropriate; and transmitting instructions to the remote device in the second operational mode to transmit and receive in the third operational mode.

Another method for controlling operation of a wireless device is provided. This method includes receiving an initial incoming signal from a remote device in a first operational mode, the initial incoming signal includes a request for assignment of a requested mode; determining whether the requested mode is an appropriate mode; setting a second operational mode to be the requested mode if the requested mode is appropriate; setting the second operational mode to be an alternate mode if the requested mode is not appropriate; and transmitting instructions to the remote device in the first operational mode to transmit and receive in the second operational mode.

The determining of whether the requested mode is an appropriate mode may be performed based on a signal metric of the initial incoming signal.

Conclusion

By dynamically switching modes in a mobile device, the system methods described above can effectively increase the gain on a reverse link of the mobile device, and can effectively increase the power to the antenna. In particular, in the LTE embodiment disclosed above, in which a duplexer is dynamically switched in and out of operation, the system and methods can provide a 1.5 dB gain on the reverse link and by providing a 1.5 dB gain on the antenna. Furthermore, the mode switch can lengthen the battery life of a mobile device by minimizing the implementation loss within the mobile device by 1.5 dB.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for controlling operation of a wireless device, including:
   receiving an initial incoming signal from a remote device in a first operational mode, the initial incoming signal includes a request for assignment of a requested mode and information related to an initial remaining batter power in the remote device;
   determining whether the requested mode is an appropriate mode by considering the initial remaining batter power in the remote device;
   setting a second operational mode to be the requested mode when the requested mode is appropriate;
   setting the second operational mode to be an alternate mode when the requested mode is not appropriate; and
   transmitting instructions to the remote device in the first operational mode to transmit and receive in the second operational mode;
   wherein at least one of the requested mode and the alternate mode comprises a duplexing mode.

2. The method of claim 1, where the at least one of the requested mode and the alternate mode comprises a half duplex mode or a full duplex mode.

3. The method of claim 1, where the requested mode comprises an operating mode characterized by a reduced power consumption.

4. The method of claim 3, where the alternate mode comprises an operating mode characterized by an increased power consumption.

5. The method of claim 1, where at least one of the requested mode and the alternate mode comprises an operating mode characterized by enhanced signal reception.

6. The method of claim 1, where the first operational mode comprises a default duplexing mode.

7. The method of claim 1, where the determining whether the requested mode is an appropriate mode is based at least in part on the initial remaining battery power exceeding a threshold.

8. The method of claim 7, where the determining whether the requested mode is an appropriate mode is further based on an amount of hysteresis.

9. A wireless apparatus, comprising:
   a wireless interface;
   a processor; and
   a non-transitory computer readable medium comprising one or more instructions, where the one or more instructions are configured to, when executed by the processor, cause the wireless apparatus to:
   receive an initial incoming signal from a remote device in a first operational mode, where the initial incoming signal includes a request for assignment of a requested mode and information related to an initial remaining batter power in the remote device;
   determine whether the requested mode is an appropriate mode based at least in part on the initial remaining batter power in the remote device;

when it is determined that the requested mode is appropriate, set a second operational mode to be the requested mode;

when it is determined that the requested mode is not appropriate, set the second operational mode to be an alternate mode; and transmit instructions to the remote device in the first operational mode to transmit and receive in the second operational mode;

where at least one of the requested mode and the alternate mode comprises a duplexing mode.

10. The wireless apparatus of claim 9, where the requested mode and the alternate mode comprise at least a full duplexing mode or a half duplexing mode.

11. The wireless apparatus of claim 9, where the determined appropriate mode is further based at least in part on a signal quality associated with the initial incoming signal.

12. The wireless apparatus of claim 9, where the determined appropriate mode is further based at least in part on an amount of network congestion.

13. The wireless apparatus of claim 9, where at least one of the requested and the alternate mode improve signal quality of the remote device.

14. The wireless apparatus of claim 9, where at least one of the requested and the alternate mode reduce power consumption of the remote device.

15. A mobile device, comprising:
a wireless interface;
a battery;
a processor; and
a non-transitory computer readable medium comprising one or more instructions, where the one or more instructions are configured to, when executed by the processor, cause the mobile device to:
determine an initial remaining battery power;
transmit an initial signal in a first operational mode to a base station, where the initial signal includes a request for a requested duplexing mode and information indicative of the initial remaining battery power; and
receive instructions in the first operational mode to transmit and receive in a second operational mode;
where the second operational mode comprises at least one of the requested duplexing mode and an alternate duplexing mode,
where the requested duplexing mode and the alternate duplexing mode comprise at least a full duplexing mode or a half duplexing mode.

16. The mobile device of claim 15, where the transmitted initial signal is configured to cause the base station to determine whether the requested duplexing mode is an appropriate mode based at least in part on the determined initial remaining battery power.

17. The mobile device of claim 16, where the base station is further configured to determine the appropriate mode based at least in part on a signal quality associated with the initial signal.

18. The mobile device of claim 16, where the base station is further configured to determine the appropriate mode based at least in part on an amount of network congestion.

\* \* \* \* \*

UNITED STATES PATENT AND TRADEMARK OFFICE
CERTIFICATE OF CORRECTION

| | | |
|---|---|---|
| PATENT NO. | : 8,712,484 B2 | Page 1 of 1 |
| APPLICATION NO. | : 13/620165 | |
| DATED | : April 29, 2014 | |
| INVENTOR(S) | : McCoy | |

It is certified that error appears in the above-identified patent and that said Letters Patent is hereby corrected as shown below:

Title Page:

Item (63) Please replace the Related U.S. Application Data Section with the following:

Continuation of Application No. 12/591,171, filed on Nov 12, 2009, now Pat. No. 8,275,424, which is a Continuation of Application No. 11/412,865, filed on Apr. 28, 2006, now Pat. No. 7,627,325.

In the Claims:

Claim 1, Column 14 Line 18:

"remaining batter" should read "remaining battery"

Claim 1, Column 14 Line 21:

"remaining batter" should read "remaining battery"

Claim 9, Column 14 Line 64:

"remaining batter" should read "remaining battery"

Claim 9, Column 14 Line 67:

"remaining batter" should read "remaining battery"

Signed and Sealed this
Fifteenth Day of July, 2014

Michelle K. Lee
*Deputy Director of the United States Patent and Trademark Office*